June 3, 1930.                P. B. DIEHL                1,761,559
                            CHAIN FASTENER
                          Filed May 18, 1929
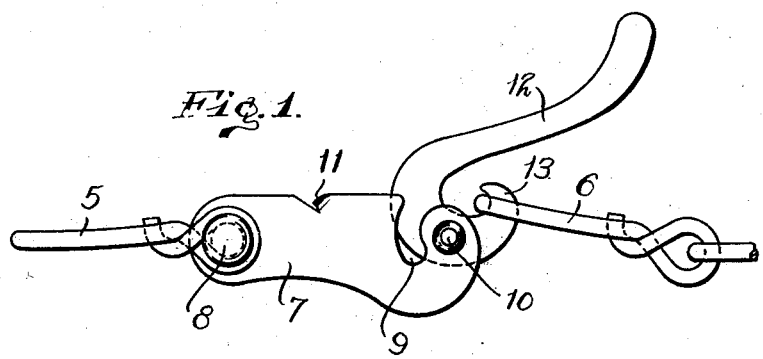
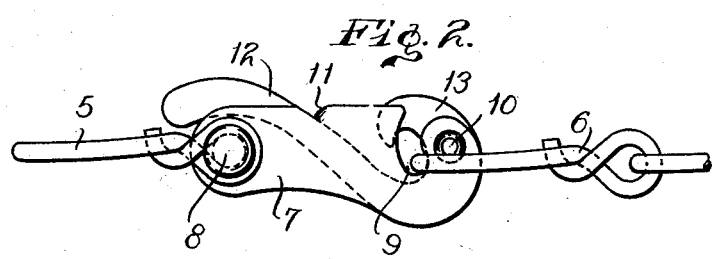
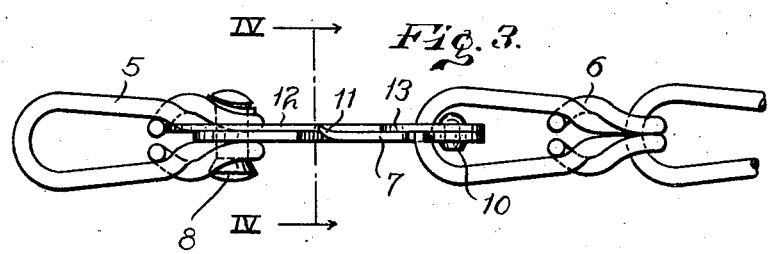
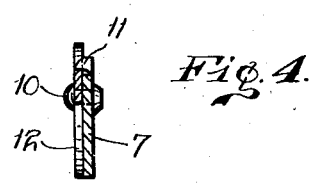
INVENTOR
Peter B. Diehl,
By Archworth Martin,
Attorney.

Patented June 3, 1930

1,761,559

UNITED STATES PATENT OFFICE

PETER B. DIEHL, OF YORK, PENNSYLVANIA, ASSIGNOR TO UNITED STATES CHAIN & FORGING COMPANY, OF PITTSBURGH, PENNSYLVANIA, A CORPORATION OF DELAWARE

CHAIN FASTENER

Application filed May 18, 1929. Serial No. 364,104.

My invention relates to chain fasteners, and more particularly to tightening and connecting devices such as are employed in fastening the side chains of anti-skid chain structures that are employed on automobile wheels, but it is capable of use in various other relations.

One object of my invention is to provide a fastener that may be readily operated to connect chain links or the like and which is conveniently operable to release chain links that are connected thereby.

Another object of my invention is to provide a fastening device which is not likely to become accidentally released and which has sufficient leverage to connect chain links under considerable tension, and whose lever is nevertheless confined within a small space in such manner that it is not likely to engage obstructions.

Still another object of my invention is to provide a fastening device of generally simplified and improved form.

One form which my invention may take is shown in the accompanying drawing wherein Figure 1 is a side elevational view of the fastening device in open position; Fig. 2 is a similar view showing the device in closed position; Fig. 3 is a plan view of the structure of Fig. 2, and Fig. 4 is a view taken on the line IV—IV of Fig. 3.

Only so much of a chain is shown as necessary to an understanding of my invention. The chain links shown in the drawing may conveniently comprise the opposite end links of a side chain such as those employed on the ordinary automobile anti-skid chains. These end links are represented by the numerals 5 and 6. The link 5 is shown as permanently secured to a connector bar or fastener body 7 by means of a rivet or pin 8. This end of the connector, I will, for convenience of description, term the forward end.

The rear end of the bar 7 is provided with an arcuately shaped recess 9 for receiving the link 6. This recess extends to a point below a pivot pin or rivet 10 and is curved back slightly so that when the link 6 is brought into the position shown in Fig. 2, such link will tend to remain seated therein under the tension of the chain. A spur or lug 11 is struck from the upper edge of the bar 7 and projects forwardly so that its rear outer portion will serve as a camming and guiding surface and its forward extremity will serve as a stop.

A latch lever 12 is pivotally supported upon a pin 10 and has an upwardly and forwardly curved tail portion 13. When the parts are in the position shown in Fig. 1, the link 6 may be hooked upon the tail portion 13, whereupon the latch lever 12 will be moved about its pivot 10 in a counter-clockwise direction. The lever is preferably of spring-like material and may be made from a metal stamping. As the lever approaches the position of Fig. 2, it will yield sufficiently to permit it to pass the spur 11 through the camming action of such spur, and when it reaches the position shown in Fig. 2, it will snap into position under the spur 11, as shown in Figs. 3 and 4. When the latch lever 12 reaches its closed position as just described, the link 6 will be moved into the recess 9 of the connecting bar. The tail portion 13 of the lever will serve also to retain the link 6 against accidental displacement from its seat 9.

When it is desired to disconnect the links 5 and 6, the outer end of the lever will be pressed sidewise from beneath the spur 11 and swung in a clockwise direction to the position shown in Fig. 1. This movement will result in forcing the link 6 out of the recess 9, so that it can be readily disengaged when the lever reaches the position shown in Fig. 1.

From the foregoing it will be seen that I provide a structure of very simple form which is nevertheless effective to permit of placing the chain under considerable tension, by reason of the relative great length of the lever 12, the lever being so formed that its outer end lies quite close to the bar 7 and to the chain link 5 so that it will not likely become caught against obstructions. This extended portion of the lever also facilitates opening movement thereof since it extends to a point considerably removed from the spur 11 and therefore permits of convenient flexing of the lever to permit it to be disengaged from the spur.

I claim as my invention:—

1. A chain fastener comprising a connector bar formed at its forward end for connection to a chain link, a latch lever pivotally supported upon the rear end of the bar and having an outwardly and forwardly curved tail portion for engagement with another chain link, the forward end of the lever being downwardly curved and extending to a point beyond the forward end of the connector bar, and a lug or spur struck from the side of the body portion in position to overlie the lever when said lever is in closed position, the lever being of yieldable material and normally lying flat against the side of the bar.

2. A chain fastener comprising a connector bar having means at its front end for connection to a chain link and having a link-engaging recess at its rear end, a latch lever pivotally supported upon the rear end of the bar at a point above the bottom of said recess, a hook-like portion on said lever for engagement with a chain link and positioned to move the link into the said recess when the lever is swung in one direction about the said pivot, the forward end of said lever when in closed position extending above and forwardly of the first-named means on said bar, and a laterally-extending lug for retaining the latch lever in operative position, the said lug projecting from the side of the latch body in position to engage the lever, and the lever being of yieldable material to permit it to be sprung sidewise out of engagement with said lug.

3. A chain fastener comprising a connector bar having means at its forward end for connection to a chain link and having a downwardly and rearwardly curved recess extending from its uppermost edge, a pivot member carried by said bar at a point above the lower portion of said recess, a latch lever mounted on said pivot member and having a forward and downwardly curved hook portion for engagement with another link, and a lug struck from the upper edge of the body portion of the said bar to overlie the lever when in closed position, the said lever having an upwardly and forwardly curved portion which when closed will extend from beneath said lug to a point above and beyond the first-named means.

4. A chain fastener comprising a connector bar having means at its forward end for connection to a chain link, a latch lever pivotally supported upon the rear end of the bar, a link-engaging recess formed on the rear portion of said lever, the lever when closed being disposed alongside of said bar for a portion of its length and its forward portion being curved upwardly and forwardly to a point above and in front of said connection means.

In testimony whereof I, the said PETER B. DIEHL have hereunto set my hand.

PETER B. DIEHL.